United States Patent [19]

Sowman et al.

[11] Patent Number: 4,801,562

[45] Date of Patent: Jan. 31, 1989

[54] REFRACTORY FIBERS OF ALUMINA AND AMORPHOUS PHOSPHORUS PENTOXIDE

[75] Inventors: Harold G. Sowman; Tai T. Tran, both of St. Paul, Minn.

[73] Assignee: Minnesota Mining and Manufacturing Company, St. Paul, Minn.

[21] Appl. No.: 49,017

[22] Filed: May 7, 1987

Related U.S. Application Data

[63] Continuation-in-part of Ser. No. 854,319, Apr. 21, 1986, abandoned.

[51] Int. Cl.$^4$ .................. C03C 13/00; C04B 35/02; C04B 35/44
[52] U.S. Cl. ........................ 501/35; 501/95; 501/153; 264/DIG. 19
[58] Field of Search ............ 501/95, 35, 153; 264/DIG. 19

[56] References Cited

U.S. PATENT DOCUMENTS

| | | | |
|---|---|---|---|
| 3,322,865 | 5/1967 | Blaze, Jr. ................ | 264/5 |
| 3,503,765 | 3/1970 | Blaze, Jr. ................ | 106/65 |
| 3,788,885 | 1/1974 | Birchall et al. .......... | 117/126 |
| 3,950,478 | 4/1976 | Kenworthy et al. ...... | 264/234 |
| 3,982,955 | 9/1976 | Mansmann et al. ...... | 501/95 |
| 4,008,299 | 2/1977 | Birchall et al. .......... | 264/63 |

FOREIGN PATENT DOCUMENTS 1360200  5/1971  United Kingdom .

*Primary Examiner*—Jacqueline V. Howard
*Assistant Examiner*—Ann M. Knab
*Attorney, Agent, or Firm*—Donald M. Sell; Lorraine R. Sherman

[57] ABSTRACT

Refractory fibers comprising a homogeneous mixture of 60 to 95 weight percent amorphous alumina and 40 to 5 weight percent amorphous phosphorus pentoxide. The fibers optionally can contain chloride, and up to 20 weight percent carbon derived from the alumina precursor material. Other organic residues can be present. The fibers are useful in the manufacture of fireproof consumer fabrics as well as reinforcement or polymeric composites.

23 Claims, No Drawings

REFRACTORY FIBERS OF ALUMINA AND AMORPHOUS PHOSPHORUS PENTOXIDE

This is a continuation-in-part of application Ser. No. 06/854,319 filed April 21, 1986, now abandoned.

FIELD OF THE INVENTION

This invention relates to refractory fibers of alumina and phosphorus pentoxide and articles made therefrom. In another aspect, it relates to a process for the preparation of such refractory fibers. The fibers are useful in the manufacture of fire-resistant materials.

BACKGROUND ART

Ceramic fibers containing aluminum/phosphorus components are kown in the art. They are known to be crystalline in structure which accounts for their friability. These fibers are not well suited for the manufacture of textile fabrics.

Ceramic fibers containing phosphates of aluminum have been disclosed. U.S. Pat. No. 4,008,299 teaches essentially crystalline filaments of aluminum phosphate. Various additives can provide some non-crystalline character. U.S. Pat. No. 3,788,885 discloses a process for binding inorganic fibrous materials which comprises applying a solution of a complex phosphate of aluminum to a fibrous material.

Polycrystalline oxide fibers, including $Al_2O_3 \cdot P_2O_5$, which melt above 1600° C. are disclosed in U.S. Pat. No 3,322,865.

$P_2O_5$ can be present as an additive in ceramic fibers. For example, polycrystalline alumina-silica fibers having as an additive 1 to 9% $P_2O_5$ are disclosed in U.S. Pat. No. 3,503,765. An alumina fiber having $P_2O_5$ present as an additive is taught in U.S. Pat. No. 3,950,478.

Br. patent specification No. 1,360,200 discloses a fiber comprising a metal compound and polyvinyl alcohol or partially hydrolyzed polyvinyl acetate and a process therefor.

SUMMARY OF THE INVENTION

Briefly, the present invention provides an amorphous refractory fiber comprising a composition of 60 to 95 weight percent amorphous alumina and 40 to 5 weight percent amorphous phosphorus pentoxide based on the total oxide composition. The fibers, optionally, can comprise up to 20 percent by weight carbon from organic components based on the total fiber composition. The fibers are essentially free of silica.

The novel fired fiber of the invention comprises an amorphous homogeneous mixture of $Al_2O_3$ and $P_2O_5$.

The alumina-phosphorus pentoxide fibers of the invention are solid, smooth, and can be transparent to visible light. The fired alumina-phosphorus pentoxide fibers of the present invention have unusual textile handling properties in that they can be repeatedly rubbed between the fingers with little evidence of friability and are useful for the manufacture of fireproof fabrics. The fibers can be modified by the addition of small amounts of additives to the precursor composition such as polyvinylpyrrolidone to provide softer fiber or other oxide components to produce a variety of colors. These physical characteristics are in contrast to those of fibers disclosed in the prior art which are crystalline in structure. The crystalline fibers of the prior art can be friable and are not as well suited for the manufacture of textile fabrics. The fabrics prepared from fibers of the present invention are particularly well suited for consumer textiles rather than solely industrial applications as are crystalline fiber fabrics.

The ceramic fibers of the present invention are made by a non-melt process comprising shaping a mixture of viscous concentrates of precursor liquids into a fiber form and then dehydratively or evaporatively gelling or hydrolyzing the drawn or spun fibers. These fibers can subsequently be dried to provide a "green" or unfired fiber. Heating and firing the shaped green fiber removes water, decomposes and volatilizes undesired fugitive constituents, and converts it into the refractory fiber of the invention.

In this application:

"ceramic" means inorganic nonmetallic material consolidated by the action of heat, such as metal and non-metal oxides;

"sol" means a fluid solution or a colloidal suspension;

"non-melt" means that the mixture is not melted although one of the components may be;

"homogeneous" means of uniform composition;

"non-vitreous" means not formed from a melt of the oxide mixture;

"green" refers to the ceramic articles which are unfired, that is, not in their final ceramic form;

"amorphous" means a material having a diffuse x-ray diffraction pattern without definite lines to indicate the presence of a crystalline component;

"refractory" means resistant to high temperatures, e.g., up to 900°-1000° C.;

"dehydrative gelling" or "evaporative gelling" mean that sufficient water and volatile material are removed from the shaped green fibers so that the form or shape of the fiber is sufficiently rigid to permit handling or processing without significant loss or distortion of the desired fibrous form or shape. Therefore, all the water in the shaped fiber need not be removed. Thus, in a sense, this step can be called partial dehydrative gelling. The shaped fibers in their green form are generally transparent to visible light and clear under an optical microscope;

"continuous fiber" means a fiber (or multi-fiber article such as a strand) which has a length which is infinite for practical purposes as compared to its diameter;

"essentially free of silica" means that any silica present in the fiber is there as an impurity, i.e., in an amount less than 0.25 weight percent of the total oxide composition, and preferably less than 0.1 weight percent;

"textile fiber" means a fiber having a soft hand suitable for the consumer market rather than heavy duty industrial textiles.

DETAILED DESCRIPTION

The present invention provides a solid, smooth, fired, refractory, amorphous homogeneous alumina-phosphorus pentoxide continuous fiber comprising 60 to 95 weight percent alumina which is in an amorphous form, and 40 to 5 weight percent phosphorus pentoxide which is also in an amorphous form.

To prepare the fibers of the invention, the aluminum and phosphorus-containing compounds which can contain soluble salts, sols or dispersible colloids or mixtures are mixed together with other optional components, such as polyvinylpyrrolidone or precursors of oxides such as copper, iron, nickel, chromium, etc. for color or other property modifications to form a homogeneous liquid precursor mixture. The components are concentrated to a fiber-forming consistency (i.e., when a rod is inserted and pulled out, a fiber is formed), by evaporation of solvent or removal of solvent from the precursor liquid mixture. To facilitate spinning of continuous fibers it is preferable that the concentrate has a viscosity in the range of 50,000 to 100,000 cps. For spinning of staple form fibers (as by use of spinning discs or blowing processes) much lower viscosities, i.e., down to 10,000 cps, are usable. Drying or removal of at least part of the water from the shaped fiber causes it to gel or become rigid. The resulting shaped "green" or non-refractory amorphous fiber can be further heated and fired at temperatures up to 1000° C. (higher temperatures result in the formation of phosphates of aluminum) which removes the remaining water, decomposes and volatilizes the undesired fugitive constituents and converts it into a refractory fiber. A particularly desirable composition comprises a molecular equivalent of 4 $Al_2O_3$:1 $P_2O_5$. At a magnification of 10,000 to 15,000 times under scanning electron microscopy, the 4 $Al_2O_3$:1$P_2O_5$ fiber can be seen to have a thin skin or sheath, of approximately 0.1 micrometer or more.

The alumina precursor useful in the present invention can include aluminum formoacetate or an aqueous aluminum chloride solution described below. Preferably, the alumina precursor can be prepared by digesting aluminum metal foil in hot aqueous aluminum chloride solution, the alumina equivalent of the final mixture being about 20 to 23% by weight.

The phosphorus pentoxide precursors useful in the present invention can include phosphoric acid, phosphorous acid, and ammonium hypophosphite. Commercially available 85% phosphoric acid is a preferred phosphorus pentoxide precursor. The phosphorus pentoxide precursor is added to the precursor liquid as shown in Example 1.

For high carbon content (black) fibers, polyvinylpyrrolidone (PVP), present in an amount 25 to 100 parts based on dry weight PVP to 100 parts oxide equivalent (Al&P), is a preferred carbon source. The PVP polymer serves not only as the carbon source but it is also useful as the viscosity modifier for spinning purposes. A convenient form for the addition of PVP is an aqueous solution with 50 weight percent K-30TM, 40,000 molecular weight (GAF, Texas City, TX).

In terms of moles, the ratio of alumina:phosphorus pentoxide is generally in the range of 10:1 to 2:1 (i.e., 88:12 to 59:41 weight percent alumina to phosphorus pentoxide based on the total oxide composition) and these fibers can range in color from white to black. In order to obtain a preferred white fiber at an alumina/phosphorus pentoxide mole ratio of 3:1 to 5:1 (i.e., 68:32 to 78:22 weight percent alumina to phosphorus pentoxide based on the total oxide composition) with excellent textile qualities, chloride is an important ingredient. When PVP is used and where the preferred white fiber is desired, the Cl to PVP mole ratio is at least 5.5:1 to 6:1 and may be as high as 7.5:1. The chloride source can be present in the preferred aluminum oxychloride precursor (basic aluminum chloride).

The precursor liquid used to make the refractory fibers of this invention optionally can also contain various other water-soluble metal compounds (calcinable to metal oxide) which will impart additional desired properties to the refractory fibers. For example, an optional component can be used to adjust refractive index, dielectric properties, or to impart, without sacrifice of clarity, an internal color to the final refractory fiber upon being converted or oxidized to the corresponding metal oxide. Thus, ferric nitrate can be added to impart an orange to gold color, chromium formate, acetate, or trioxide to impart to the fibers a green color, cobalt acetate or nitrate to imparts a blue or lavender color, vanadyl sulfate to impart a yellow color, and nickel acetate to impart a light green to blue color. Such colored refractory fibers are desirable for the weaving of design textile fabrics. These colored filaments are also useful for color coding in ceramic fiber articles. The ferric oxide-containing refractory can be reduced in a hydrogen atmosphere to produce a cermet, black in color and attractive to a magnet. Other optional compounds are the water soluble nitrates, formates, acetates, citrates, lactates, tartrates, or oxalates of lithium, sodium, potassium, magnesium, calcium, strontium, barium, yttrium, titanium, zirconium, chromium, manganese, iron, cobalt, nickel, copper, zinc, tin, antimony, lanthanum, and vanadium as vanadyl sulfate.

The amount of such other optional metal oxide in the refractory component can vary, depending upon the property effect desired, for example the tone of the color or hue desired, but generally will comprise an amount in the range of as low as 0.05 to 0.5 and can be as much as 25 weight percent based on the total weight of the oxide components in the refractory fiber.

Each of the fiber precursor materials initially will be a relatively dilute liquid, generally containing about 10–30 weight percent equivalent oxide, which can be calculated from a knowledge of the equivalent solids in the original materials and the amount used, or determined by calcining samples of the component starting materials. For the preparation of a fiber, it is necessary to concentrate or viscosify the dilute liquid mixture of Al and P-containing precursors in order to convert it to a viscous or syrupy fluid concentrate. The concentrate will readily gel when it is fiberized and dehydrated, for example, when the concentrate is extruded and drawn in air to form the fiber. For example, the mixture can be concentrated with a Rotavapor TM (Buchi, Switzerland) flask under vacuum. The concentration procedures are well known in the art; see for example, U.S. Pat. No. 3,795,524. Sufficient concentration will be obtained when the equivalent oxide solids content is generally in the range of 25 to 55 (as determined by calcining a sample of the concentrate), and viscosities (Brookfield at ambient room temperature) are in the range of 10,000 to 1,000,000 cp, preferably 40,000 to 100,000 cp, depending on the type of fiberizing or dehyrative gelling technique and apparatus used and the desired shape of the gelled fiber. High viscosities tend to result in fibers which are more circular in cross-section whereas low viscosities (e.g., less than 50,000 cp) tend to result in fibers which are more oval or rod-like (elongated ovoid) in cross-section.

In making continuous fibers, the viscous concentrates can be extruded through a plurality of orifices (e.g., a total of 10 to 400) from a stationary head and resulting green fibers allowed to fall in the air by the force of gravity or drawn mechanically in air by means of drawing rolls or a drum or winding device rotating at a speed faster than the rate of extrusion. The concentrate can also be extruded through orifices from a stationary or rotating head and at the orifice exit blown by a parallel, oblique or tangential stream of high pressure air, such as in the making of cotton candy, the resulting blown green fibers being in essentially staple or short form with lengths generally 25 cm or less (rather than the continuous filament form) and collected on a screen or the like in the form of a mat. Any of these forces exerted on the extruded, green fibers cause attenuation or stretching of the fibers, and can reduce their diameter by about 50 to 90 percent or more and increase their length by about 300 to 1000 percent or more and serve to hasten or aid the drying of the green fibers.

The dehydrative gelling of the green fibers can be carried out in ambient air, or heated air if desired or necessary for faster drying. The drying rate assists in controlling the shape of the fiber. (It has been found that too rapid drying may cause distortion of the shape of the fiber.) The relative humidity of the drying air should be controlled since excess humidity will cause the gelled green fibers to stick together and excessively dry air tends to result in fiber breakage. Generally, air with relative humidity in the range of 20 to 60 percent at an operative temperature of 15°–30° C. is most useful, although drying air temperatures of 70° C. or more can be used. Where continuous green fibers are made and gathered together in parallel alignment or juxtaposition in the form of a multi-fiber strand, the fibers or strand should be treated with a size to prevent the fibers from sticking together.

The fibers in the green or unfired gel form are dry in the sense that they do not adhere or stick to one another or other substrates and feel dry to the touch. However, they still may contain water and organics, and it is necessary to heat and fire the green fibers in order to remove these remaining fugitive materials if an all oxide (carbon free) fiber is desired and convert the green fibers into refractory fibers. In certain cases it may be desirable to fire so as to retain carbon in the fiber, for example, to provide for a black color or for a high thermal emissivity fiber. In addition, useful fibers are also obtained when only part of the organics (organic residues) are removed to result in very flexible organic-inorganic hybrid fibers. As much as 25 weight percent of the fired fiber may be organic residues (e.g., C, H, O, N, etc.)

The green fibers in their continuous form are preferably gathered or collected in the form of a strand, the strand then being accumulated in a relaxed, loose, unrestrained configuration of offset or superimposed loops as in a "Figure 8".

In firing the green fibers, care should be exercised to avoid ignition of combustible material (organics within or size upon the fiber) in or evolved from the fibers resulting in an improper rate of temperature rise of the firing cycle. Such overfiring or rapid rate of heating may result in frangible fibers. The most satisfactory schedule for firing and atmosphere control to avoid over-firing can be determined empirically.

The present invention provides continuous uniformly round, oval, rod-like (elongated ovoid) or ribbon-like, strong, flexible, smooth, glossy refractory amorphous fibers. The fibers of this invention are particularly useful in making ceramic fiber textiles not only having utility in the 500°–1000° C. temperature range, but also in fire-resistant materials such as upholstery fabrics. The fabrics of the instant invention are also useful in combination with polymeric materials, for example, clear vinyls for upholstery fabrics. The fibers are also useful as fillers and reinforcement for plastic composites.

Objects and advantages of this invention are further illustrated by the following examples, but the particular materials and amounts thereof recited in these examples, as well as other conditions and details, should not be construed to unduly limit this invention. All percents and parts are by weight unless otherwise stated.

In the Examples below:

"22.69 wt % alumina sol" is the Al-aluminum chloride sol prepared by digesting aluminum foil (Kaiser Aluminum Co.) in the solution of $AlCl_3.6H_2O$ which was dissolved in deionized water then heated to about 85°–90° C. and maintained at this temperature until all of the foil was completely digested.

The "20.5 wt % alumina sol" is also an $Al-AlCl_3$ sol, prepared as above, but the aluminum foil was made by Reynolds Aluminum Co.

The PVP[K-30] is a 50% aqueous solution prepared by dissolving the PVP[K-30] powder in deionized water in a 1:1 weight ratio. In all examples, PVP is shown as that amount added to 100 parts equivalent oxide composition of the fired fibers.

EXAMPLE 1

An alumina precursor was made by digesting aluminum metal foil in hot aqueous aluminum chloride solution. To 196.5 grams of the alumina precursor containing an equivalent of 40.9 grams of $AL_2O_3$ was added 23.1 grams of 85% phosphoric acid. The final mixture had an alumina equivalent of 18.6 wt %. To this liquid mixture, 36.6 grams of a 50 weight precent aqueous solution of polyvinylpyrrolidone (K-30) was added with stirring. The fiber precursor comprised 3 parts by weight of a molecular equivalent of $4Al_2O_3:11P_2O_5$ and 1 part by weight of PVP (dry basis).

The resultant dispersion was filtered through a 0.3 micrometer Balston ™ cartridge filter (Balston, Inc., Lexington, MA) and concentrated in a Rotavapor flask to a viscosity measured to be 68,000 cp Brookfield. The concentrate was spun through a 30 hole spinnerette having 102 micrometer diameter holes and using a pressure of 1.38 MPa (200 psi) [1 psi=6900 Pa]. The filaments were drawn downward at a linear rate of 82.2 meters/min (270 ft/min) through a vertical cylinder 1.2 meters (4 ft) long by 17.8 cm (7 inches) diameter. Dry room temperature air was passed upward through the cylindrical stack at about 1.42 L/sec (3 cfm). Infra red lamps were directed at the fibers as they were collected on a 61 cm (24 inch) drum to assist sufficient drying to prevent the fibers from sticking together.

A part of the fiber bundle which was cut at one point, was removed from the drum and was suspended in a 50° C. oven for further drying. These fibers which were dried at fifty degrees were divided into five parts and fired from 50° C. to various higher temperatures. The resulting data are tabulated in TABLE I, below.

TABLE I

| Temperature | Time to reach temp. from room temp. | Results |
|---|---|---|
| 600° C. | 1 hour | clear gold 10 micrometer dia. strong, shiny, smooth, soft, and transparent |
| 700 | 1 hr., 20 min. | off-white, otherwise like 600° C. fibers |
| 800 | 1 hr., 35 min. | slightly off-white, otherwise like above |
| 900 | 2 hours | white to the eye, otherwise as above |
| 1000 | 2 hrs., 30 min. | white, translucent, dull, weak and friable |

X-ray diffraction data indicated that all the fibers fired at temperatures ranging from 600° to 900° C. were amorphous. The fibers which were fired at 1000° C. were crystallized to AlPO$_4$ and eta or gamma alumina. The tensile strength of the 900° C. fibers was 1.3 GPa (190,000 psi) and the modulus of elasticity was 135 GPa (19.5 million psi).

EXAMPLE 2—98 weight percent colored Al$_2$O$_3$-P$_2$O$_5$ fibers (4 Al$_2$O$_3$:1 P$_2$O$_5$)+2% CoO In a 100 ml beaker, the following materials were mixed together using a magnetic stirrer.

1. 37.41 g Al AlCl$_3$ sol*

*Al-AlCl$_3$ sol is made by digesting Al foil in hot aqueous solution (85°–90° C.) of AlCl$_3$. The Al$_2$O$_3$ equivalent was 19.8% by wt.

2. 4.2 g H$_3$PO$_4$ 3. 6.0 g PVP (K-30), 50% by wt. aqueous solution, so as to provide 3 g PVP or 30 parts PVP to 100 parts oxide equivalent 4. 0.67 g Co(CH$_3$COO)$_2$.4H$_2$O dissolved in 30 mL deionized water.

The resulting mixture was pressure-filtered at 0.1–0.14 MPa (15 to 20 psi) through a 0.3 micrometer Balston filter cartridge and a 1 micrometer Millipore ™ filter (Millipore Corp., Bedford, MA) into a 100 mL round bottom flask. The mixture was then concentrated in a rotating evacuated flask (40° C. water bath and 28–29 inches [711–737 mm Hg vacuum]) to a viscosity of about 75,000–80,000 cp. This clear pinkish-blue sol concentrate was extruded through a 102 micrometer diameter-80 hole spinnerette at 1.04 MPa (150 psi). Fibers were drawn downward and collected on a wheel at a linear speed of 80 fpm [24 meters/min]. The spinning chamber was heated by heat lamps mounted along the falling path of fibers. The ambient relative humidity was about 45–50%.

The bright blue fibers obtained were fired from room temperature to 600° C. in 1 hour; 600°–700° C. in 20 minutes; 700°–800° C. in 15 minutes, then cooled to about 500° C. The fired fibers were removed from the furnace. The fibers were light blue in color and transparent. They were soft textured, strong, shiny and smooth.

EXAMPLE 3

Using the procedure of Example 2, to 71.08 g (19.83 percent alumina equiv.) of a mixture of Al-AlCl$_3$ sol, and 7.97 g H$_3$PO$_4$, was added 3.34 g of nickel acetate (to give a 5% NiO equivalent) and 12.0 g of 50 wt % aqueous PVP solution. The fiber precursor was concentrated to 75–80,000 cp and spun into fibers using the procedure of Example 2. The fibers were fired up to 800° C., then to 900° C. These fibers were brown colored and very strong with a soft texture. Some of the fibers were then fired to 1000° C. These fibers were light green in color and were very fragile/friable.

In Examples 4 to 15 alumina-phosphorus pentoxide fibers were made by the following basic procedure. The order of addition of raw materials to prepare the spinning sol is as listed. This group of samples was prepared to establish the effect of chlorine on the final product, the effect of the polyvinylpyrrolidone, molar ratios, additives, and raw material source.

EXAMPLE 4—10 Al$_2$O$_3$:1 P$_2$O$_5$

In a beaker the following materials were mixed together:
1. 77.4 g of 22.69 wt % alumina sol.
2. 11.77 g concentrated HCl acid.
3. 4.0 g phosphoric acid, concentrated.

4 12.0 g PVP [K-30]50 percent aqueous solution.

The mixture was filtered through a 0.3 micrometer Balston cartridge filter and a 1 micrometer Millipore filter, and concentrated in a Rotovapor to a viscous sol of about 90,000 cp. The viscous sol was then extruded through a 40-hole 102-micrometer diameter orifice spinnerette. Filaments were drawn and collected at 30 meters per minute. The extruded fibers were then fired immediately by draping them over a ceramic rod in a furnace equipped with a programmed temperature control.

The firing schedule was:
room temperature to 600° C. in 1 hour,
600° to 700° C. in the next 20 minutes,
700°–800° C. in the final 20 minutes,
then cooled to room temperature. The fired fibers were removed from the furnace, they were white, transparent and fairly strong.

EXAMPLE 5—2 Al$_2$O$_3$:1 P$_2$O$_5$ 1. 52 g of Al-aluminum chloride sol having an equivalent alumina content of 22.69 wt %.
2. 7.9 g of concentrated HCl
3. 13.34 g of concentrated phosphoric acid.
4. 12.0 g of 50 wt percent aqueous solution PVP [K-30].

The sol viscosity was 95,000 cp, spinning was performed in a spinnerette having forty 102-micrometer diameter orifices with a draw rate of 25 meters per minute wheel speed. The fibers were fired to 800° C. and were black, shiny, soft and strong.

EXAMPLE 6—98 weight percent 4 Al$_2$O$_3$: 1 P$_2$O$_5$+2 weight percent iron oxide [Fe$_2$O$_3$].

1. 37.41 g Al-aluminum chloride sol [19.83 wt percent alumina]
2. 4.2 g conc. phosphoric acid
3. 6.0 g 50% aqueous PVP [K-30]
4. 0.68 g of FeCl$_3$.6H$_2$O was dissolved in 30 mL deionized water and then stirred into the mixture of 1-3 above.

The sol was concentrated to a viscosity of 76,000 cp and was spun through a 40 hole spinnerette having 76 micrometer diameter orifices.

The "green" fibers were fine, curly and a light orange color. The fibers fired to 800° C. were fine, curly and pinkish in color.

EXAMPLE 7—100 weight percent Alumina 1. 100 g of [22.69 wt percent alumina] Al-aluminum chloride sol
2. 8.93 g of 50 wt percent aqueous solution of PVP [K-30]

The sol was concentrated to a viscosity of 120,000 cp and spun from a 40 hole spinnerette having 76 micrometer diameter orifices. Fibers were drawn and collected at a linear rate of about 12 meters per minute. The fibers fired to 800° C., were white in color but stiffer than the alumina-phosphorus pentoxide fibers.

Example 8

Using the procedure of Example 4, fibers having the formulations shown in TABLE II were prepared with the concentrated sols having viscosities of about 100,000 cps.

TABLE II

| Sample | Al:AlCl₃ sol* 20.5% Al₂O₃ | Chloride:PVP Ratio H₃PO₄ acid | HCl conc | PVP [K-30] 50% aq. soln | Cl:PVP ratio |
|---|---|---|---|---|---|
| 8A | 36.20 g | 4.2 g | 5.50 g | 6.0 g | 7:1 |
| 8B | 36.20 g | 4.2 g | 0.00 g | 4.0 g | 7:1 |

*sol from Reynolds ™ Al foil

Both fibers were heat treated to 800° C. at the same time in the same furnace under the same conditions. Both fibers were clear, white and soft. The 8B sample was slightly stiffer than 8A (less PVP content). As the samples aged in air, they became softer to the hand. The fired fibers had an $Al_2O_3:P_2O_5$ ratio of 4:1.

EXAMPLES 9–11

Using the procedure of Example 4, fibers having the formulations shown in TABLE III were prepared from sol concentrates having viscosities of about 100,000 cp.

These six samples were prepared using the same amount of phosphoric acid, 8.4 g and 12.0 g of 50 percent aqueous PVP [K-30]. The data is shown in Table III below.

TABLE III
Effect of Chloride Content on Color

| Sample | Al—AlCl₃ grams | HCl grams | Cl from HCl | Cl from Al—AlCl₃ | Total Cl moles | Color* |
|---|---|---|---|---|---|---|
| 9A | 65.4** | 3.27 | 1.16 | 8.44 | 0.270 | tan |
| 9B | 65.4** | 6.54 | 2.32 | 8.44 | 0.303 | beige |
| 10A | 72.4*** | 7.24 | 2.57 | 9.34 | 0.335 | off white |
| 10B | 72.4*** | 3.62 | 1.29 | 9.34 | 0.300 | tan |
| 11A | 72.4*** | 5.40 | 1.92 | 9.34 | 0.317 | beige |
| 11B | 65.4** | 8.40 | 2.98 | 8.44 | 0.322 | white |

*color of fibers fired to 800° C.
**sol from Kaiser ™ Al foil
***sol from Reynolds ™ Al foil concentrated HCl (36.5%)

The data show that a mole ratio of about 5.5:1 to 6:1 Cl to PVP was required to obtain the white fibers. The mole ratio was calculated on the basis of the PVP monomeric unit of a 111 molecular weight. The molecular ratio of $Al_2O_3:P_2O_5$ in the fired fiber was calculated to be 4:1.

EXAMPLE 12

Two alumina-phosphorus pentoxide fibers having the mol ratios shown in TABLE IV were prepared using the procedure of Example 4. The fibers were fired from room temperature to 800° C. over a period of 1¾ hours. The fibers had the properties shown in Table IV below.

TABLE IV
Varying Alumina-Phosphorus Pentoxide Ratio

| Sample | Composition | Raw Materials | Additive | Properties |
|---|---|---|---|---|
| 12A | 10 Al₂O₃:1 P₂O₅ (87.8:12.2 wt %) | Al—AlCl₃ H₃PO₄ | HCl 30% PVP | off-white transparent, strong |
| 12B | 2 Al₂O₃:1 P₂O₅ (59:41 wt %) | Al—AlCl₃ H₃PO₄ | HCl 30% PVP | black, shiny soft, strong |

EXAMPLE 13

Three colored fiber lots were prepared using various additives and using the procedure of Example 4, in which the $Al_2O_3:P_2O_5$ molecular ratio was .4:1. The source of alumina was AlCl₃ sol; the source of P₂O₅ was H₃PO₄ (85%). PVP, 30% (50% aqueous solution) was added to the liquid precursor in all samples. The data is given in TABLE V below.

TABLE V

| Sample | Composition | Additive | Firing temp. | Properties |
|---|---|---|---|---|
| 13A | 95%, 4 Al₂O₃:1 P₂O₅ 5% NiO | nickel acetate.4H₂O | 700° C. | dark brown, strong |
|  |  |  | 800° C. | soft brown, strong |
|  |  |  | 900° C. | brown |
|  |  |  | 1000° C. | bluish, friable |
| 13B | 98%, 4 Al₂O₃:1 P₂O₅ 2% Fe₂O₃ | FeCl₃.6H₂O | 800° C. | fine, curly, pinkish |
| 13C | 98%, 4 A₂O₃:1 P₂O₅ 2% CoO | cobalt acetate.4H₂O | 800° C. | blue, transparent |

EXAMPLE 15

Using the procedure of Example 4, five fiber lots were prepared having varying alumina and phosphorus pentoxide sources, and with and without PVP. The data is shown in TABLE VI below.

TABLE VI
Alumina-phosphorus pentoxide fibers

| | Ratio | Composition | | Firing temp. | Properties |
|---|---|---|---|---|---|
| F | 4:1[a] | Niacet[b] | AHP[c] No PVP[d] | 1000° C. | Black, soft, strong, shiny or glossy[g] |
| G | 4:1 | Niacet | AHP 30% PVP | 600° C. | Black, curly |
|  |  |  |  | 700° C. | black, curly, weak |
| H | 4:1 | Al—AlCl₃[e] | H₃PO₄ No PVP | 600° C. | Lt. Brown, dull, weak |
|  |  |  |  | 700° C. | Lt. Yellow, friable |
| I | 4:1 | Al—AlCl₃ | H₃PO₄ 30% PVP | 600° C.[f] | Brown, shiny, strong |
|  |  |  |  | 700° C. | Beige, shiny, strong |
|  |  |  |  | 800° C. | Off-white, shiny, strong |
|  |  |  |  | 900° C. | Off-white, shiny, strong |
|  |  |  |  | 1000° C. | Off-white, shiny, strong |
| J | 4:1 | Al—AlCl₃ | H₃PO₄ 100% PVP | 700° C. | Black, shiny, strong |
|  |  |  |  | 800° C. | Black, shiny, strong |

[a] 4:1 ratio is 4 Al₂O₃:1 P₂O₅
[b] Niacet: aluminum formoacetate
[c] AHP: ammonium hypophosphite
[d] PVP: polyvinylpyrrolidone (K-30) parts by weight based on 100 parts by weight oxide equivalent
[e] Al—AlCl₃:sol derived from aluminum digested in aluminum trichloride aqueous solution
[f] Fiber contained about 18 percent organic residue
[g] Carbon content of 16.4 to 17.9 was found by analysis of several samples

EXAMPLE 16

A fiber sample was prepared using the procedure of Example 7 except the precursor sol comprised 20.7 weight percent equivalent alumina. An aluminum formoacetate solution was prepared from 40 g Niacet in 70 g water at 70° C. This solution was stirred into 200 g. of the alumina sol. Thirty-six g of 50% solution of PVP was stirred into the sol solution mixture. This mixture was concentrated in a Rotavapor to 88,000 cp. After standing, the viscosity increased to 232,000 cp. The fiberizable concentrate contained 24.4% alumina equivalent by weight.

Spinning into fibers was accomplished by extruding at a pressure of 4 MPa (580 psi) through a stainless steel die with forty 75-micrometer diameter holes. Drawing the extruded filaments through a dryer (27°-32° C.) at a linear rate of 54 m/min (180 feet/min.) resulted in fiber that was then drawn together in a strand and deposited randomly in a stainless steel belt moving continuously through 4.2 meter (14 foot) long kiln. The strands passed through the kiln over a 20 min. period of time and reached a maximum temperature of 600° C. for several minutes. The 600° C. fibers were amorphous. The resultant fibers were light brown in color, transparent and clear under the microscope and felt very much like hair. They could be abraded continuously through the fingers without dusting. They had a tensile strength of 1.7 GPa (250,000 psi). The diameter of the fired fibers was 11 to 12 micrometers.

Calcination of the fibers at 620° C. for 15 min. caused them to lose 21 percent of their weight which indicated a fugitive content of 21 weight percent. After firing to 700° C. the fibers were white and they no longer had a soft quality.

Various modifications and alterations of this invention will become apparent to those skilled in the art without departing from the scope and spirit of this invention, and it should be understood that this invention is not to be unduly limited to the illustrative embodiments set forth herein.

We claim:

1. A refractory fiber consisting essentially of a homogeneous mixture of amorphous alumina and amorphous phosphorus pentoxide, the mole ratio of alumina to phosphorus pentoxide being in the range of 10:1 to 2:1, said fiber being essentially free of silica by containing less than 0.25 weight percent silica based on the total oxide composition, and said fiber being of uniform shape.

2. The fiber according to claim 1 further comprising up to 20 weight percent carbon based on the total fiber composition.

3. The fiber according to claim 2 wherein said carbon is derived from polyvinylpyrrolidone.

4. The fiber according to claim 1 wherein said fiber has in addition chloride derived from an alumina precursor or HCl.

5. The fiber according to claim 4 wherein said alumina precursor is basic aluminum chloride.

6. The fiber according to claim 5 wherein the chloride to polyvinypyrrolidine mole ratio is in range of 5.5:1 to 7.5:1.

7. The fiber according to claim 6 wherein said chloride to polyvinylpyrrolidone mole ratio is at least 5.5:1 to 6:1.

8. The fiber according to claim 1 which is incorporated into a textile article or a composite article.

9. The fiber according to claim 1 having in addition up to 25 weight percent organic residues based on total fiber composition.

10. The fiber according to claim 1 which is a continuous fiber.

11. The fiber according to claim 1 wherein said fiber is transparent.

12. A refractory fiber consisting essentially of a homogeneous mixture of amorphous alumina and amorphous phosphorus pentoxide, the mole ratio of alumina to phosphorus pentoxide being in the range of 3:1 to 5:1, said fiber being essentially free of silica by containing less than 0.25 weight percent silica based on the total oxide composition, and said fiber being of uniform shape.

13. A refractory fiber having a homogeneous composition consisting essentially of amorphous alumina and amorphous phosphorus pentoxide, the mole ratio of aluminia to phosphorus pentoxide being in the range of 10:1 to 2:1, said fiber being essentially free of silica by containing less than 0.1 weight percent silica based on the total oxide composition, and said fiber being of uniform shape.

14. A refractory fiber having a homogeneous composition consisting essentially of amorphous alumina and amorphous phosphorus pentoxide, the mole ratio of alumina to phosphorus pentoxide being in the range of 3:1 to 5:1, said fiber being essentially free of silica by containing less than 0.1 weight percent silica based on the total oxide composition, and said fiber being of uniform shape.

15. The fiber according to claim 12 having a thin skin of 0.1 micrometer or more.

16. A method for preparing a refractory fiber having a homogeneous composition consisting essentially of amorphous alumina and amorphous phosphorus pentoxide, the mole ratio of alumina to phosphorus pentoxide being in the range of 10:1 to 2:1, said fiber being essentially free of silica by containing less than 0.25 weight percent silica based on the total oxide composition, comprising the steps:

(a) preparing a viscous precursor liquid mixture comprising an alumina precursor and a phosphorus pentoxide precursor having an oxide solid content in the range of 25 to 55 weight percent and a viscosity in the range of 10,000 to 1,000,000 cP, (b) shaping said viscous concentrate in a fiber form by draping or spinning, (c) evaporatively gelling or hydrolyzing the resultant formed fiber to provide a green fiber comprising a homogeneous mixture of alumina and phosphorus pentoxide precursors, and (d) firing said green fiber to a temperature of at most 1000° C. and for a time sufficient to provide a fired fiber consisting essentially of a homogeneous mixture of amorphous alumina and amorphous phosphorus pentoxide, said temperature and time being insufficient to provide a polycrystalline fiber.

17. The method according to claim 16 wherein said alumina precursor liquid is prepared from aluminum metal foil and aqueous aluminum chloride.

18. The method according to claim 16 wherein said alumina precursor is aluminum formoacetate.

19. The method according to claim 16 wherein said phosphorous pentoxide precursor liquid is phosphoric acid, phosphorous acid, or ammonium hypophosphite.

20. The method according to claim 19 wherein said phosphorous pentoxide precursor liquid is phosphoric acid.

21. The method according to claim 19 wherein said mixture of viscous precursor liquids has in addition polyvinylpyrrolidone.

22. The method according to claim 16 wherein said mixture of viscous precursor liquids has in addition a water-soluble metal compound.

23. The method according to claim 22 wherein said metal is Fe, Cr, Co, Va or Ni.

* * * * *

UNITED STATES PATENT AND TRADEMARK OFFICE
CERTIFICATE OF CORRECTION

PATENT NO. : 4,801,562

DATED : January 31, 1989

INVENTOR(S) : Harold G. Sowman et al.

It is certified that error appears in the above-identified patent and that said Letters Patent is hereby corrected as shown below:

Col. 6, line 29, delete "1lP$_2$O$_5$" and insert therefor -- 1P$_2$O$_5$ --

Col. 8, line 1, delete "4" and insert therefor -- 4. --.

Col. 10, line 21, delete "AlCl$_3$" and insert therefor -- Al AlCl$_3$ --.

Signed and Sealed this

Fourth Day of July, 1989

Attest:

Attesting Officer

DONALD J. QUIGG

Commissioner of Patents and Trademarks